2,864,706
METHOD AND COMPOSITIONS FOR THE PREPARATION OF CARRAGEENIN WATER GELS

Leonard Sidney Stoloff, New Bedford, Mass., assignor to Seaplant Chemical Corporation, New Bedford, Mass., a corporation of Delaware No Drawing. Application April 11, 1956
Serial No. 577,458

19 Claims. (Cl. 99—131)

This invention relates to the preparation of improved carrageenin water gels and to compositions useful for that purpose.

Carrageenin is a gelling agent derived from the red sea plants *Chondrus crispus* and *Gigartina stellata* and other related members of the family Gigartinaceae. The term carrageenin as employed in the specification refers to any soluble salt or salt mixture of the polysaccharide sulfate complex that essentially constitutes the hydrocolloid extracted from these seaplants. Dried extractives of these seaplants, consisting principally of carrageenin, are available on the market. Carrageenin forms clear edible water gels over a wide pH range when dissolved in water in the presence of various cations such as potassium, ammonium, calcium and magnesium. Potassium ions are particularly effective for the gelation of carrageenin sols. The properties of carrageenin and its gels are described in the Encyclopedia of Chemical Technology, vol. 12, pages 120–123, published by The Interscience Encyclopedia, Inc., New York, New York (1954). Water gels of carrageenin are normally short and inelastic compared with aqueous gels of algin, pectin, agar or gelatin. A "short" gel is one that breaks with relatively little stretch. An elastic gel, on the other hand, can be stretched considerably before breaking. Elasticity is independent of breaking strength since it is possible to prepare two gels with the same breaking strength but widely different elasticities. Water gels of carrageenin, although widely used, have not been satisfactory for many purposes due to their characteristic shortness and inelasticity.

For example, gelatin is the preferred agent for water gel desserts since it produces a clear gel with an elastic texture which provides a pleasant shimmery appearance, a smooth cut and a yielding mouth feel. Gelatin is not, however, without disadvantages as a gelling agent for desserts. Its gels have such a low setting and remelt temperature that refrigeration is necessary in the preparation and storage of a gelatin water gel dessert. Further gelatin sols have a tendency to super-cool, i. e., cool below their normal setting temperature without gelling, thus necessitating a prolonged period of time for the preparation of the dessert gel. Carrageenin water gels, on the other hand, although normally short and inelastic and lacking in the desirable eating qualities of gelatin gels, do not super-cool and their gelling and melting temperatures can be regulated over a fairly wide range through control of the concentration of the salts used to promote gelation. Therefore, by adjusting the gelling temperature of the carrageenin sol to a relatively high value, the time required for preparing a dessert gel can be considerably reduced and the necessity for refrigeration eliminated. It is apparent, therefore, that if the elasticity and eating qualities of carrageenin water gels could be improved, these gels would be preferred over gelatin gels in the water gel dessert field.

Pectin is the preferred gelling agent in the preparation of high sugar content fruit table jellies since it provides a clear, elastic gel having a pleasing appearance and good spreading qualities. Pectin, however, like gelatin, has several disadvantages not characteristic of carrageenin. For example, pectin requires a high concentration of sugar to obtain its set and will gel only in a limited pH range. Carrageenin, on the other hand, forms satisfactory water gels regardless of the sugar concentration or, for practical purposes, the pH of the sol.

The inherent lack of elasticity of carrageenin gels has limited their usefulness in many fields other than the preparation of foodstuffs. For example, carrageenin has been unsatisfactory for the preparation of dental impression gels since the short texture of carrageenin gels prevents removal of shaped forms of these gels from dental molds without rupture.

It is apparent from the foregoing discussion that a need has existed for a method of improving the texture and elasticity of carrageenin water gels. Various solutions to the problem have been suggested, e. g. Baker, U. S. Patent 2,466,146, teaches the incorporation of locust bean gum in a carrageenin water gel in order to improve its elasticity. I have found, however, that it is not necessary to add an extraneous gum or gelling agent to the carrageenin sol in order to improve the elastic properties of the final gel.

The present invention is based upon the discovery that the characteristic shortness and lack of elasticity of carrageenin water gels is due to the presence of certain cations, specifically those of sodium, calcium, magnesium and ammonium, which I refer to as shortening ions. In my invention the effect of the shortening cations is eliminated by employing the potassium salt of a sequestering agent to chemically bind the offending ions in substantially unionized complexes. I have found that by this expedient it is possible to produce carrageenin water gels of greatly enhanced texture and elasticity, having a desirable smooth cut and mouth feel. The gels produced according to my invention are suitable for use in water gel desserts as well as in other applications for which carrageenin gels were previously unsuitable. I have also discovered that the potassium ion does not have a tendency to shorten carrageenin gels. It is essential, therefore, that only the potassium salts of sequestering agents be used in practicing my invention and, therefore, whenever the term "sequestering agent" is employed herein it is intended to mean the potassium salt of such an agent.

My invention comprises not only the method of producing carrageenin water gels of improved elastic properties by nullifying the effect of shortening ions with the potassium salt of a sequestering agent but compositions comprising carrageenin or Irish moss extractives and the potassium salt of a sequestering agent with or without other materials. These compositions, when added to a suitable amount of water and heated slightly to bring about solution, produce gels of the improved properties described above.

The compositions may also contain salts to promote gelation and various other materials such as sugar, acid, acid buffer, flavoring, coloring, inert fillers and the like, which do not prohibit gelation and contribute valuable properties to the final gel product. The gelation promoting salts, of course, may contain any of the common neutralizing cations although it is preferred that only potassium salts be used since other common cations have a shortening effect on the carrageenin gel. The amount of sequestering agent employed, of course, must be increased sufficiently to bind all of the shortening cations thus introduced. It is preferred, therefore, either to supply the necessary gelation promoting cations as the potassium ions of the sequestering agent itself or partially from the sequestering agent and partially from another potassium salt, if that expedient is more economical. The latter method can be used to control the properties of the final carrageenin gel since the strength of the gel and the gelling temperature depend upon the concentration of gelation promoting salt and the elasticity of the gel depends upon the amount of sequestering agent used. Therefore, by adjusting the relative proportions of sequestering agent and additional gelation promoting salt, the breaking strength, elasticity, gelling temperature and texture of the final carrageenin can be controlled over wide ranges.

The proportions of gelation promoting salts employed in the preparation of carrageenin gels may be varied considerably as is already known to those skilled in the art. For most commercially available extractives about 10% to 30% of salt, based on the weight of carrageenin or Irish moss extractive, is required to produce gels of general utility. Approximately 0.5% to 3% of carrageenin, based on the weight of water, is required to produce a satisfactory gel for most purposes. The amount of sequestering agent required to materially enhance the elastic properties of carrageenin gels according to the present invention varies with the particular carrageenin or Irish moss extractive employed since these materials contain greatly varying amounts of shortening ions. Other factors which affect the amount of sequestering agent required include the shortening ion content of the water used to form the sol, the pH of the sol since it affects the binding power of most sequestering agents, whether or not the sequestering agent is used to supply the necessary gelation promoting cations as well as to bind shortening ions and whether or not extraneous shortening ions have been added to the sol for any reason. In general, I have found that the elasticity of carrageenin water gels is sufficiently increased for most purposes when the effective shortening ion content is reduced to less than about 0.05 gram equivalents of shortening ion per liter of carrageenin sol. The amount of sequestering agent required to achieve this end is easily determined under all of the conditions by trial and error methods based on the properties of the gel.

I have found that any type of sequestering agent can be used with advantage in the present invention. Many types of sequestering agents are known and the term is understood in the art to comprise a large class of more or less unrelated chemical substances which have the ability to bind metallic ions into a soluble complex or other form in which they are relatively unionized. The various classes of sequestering agents are described by Kroll and Knell in the Encyclopedia of Chemical Technology, vol. 12, pages 164 to 181. I have found that the potassium salts of various polycarboxylic acids and carboxylic acids containing hydroxy groups are particularly useful in my invention. Examples of such sequestering agents include the potassium salts of citric, tartaric, adipic, succinic and gluconic acids among others. The potassium salt of ethylenediaminetetraacetic acid, potassium pyrophosphate, potassium tripolyphosphate and potassium metaphosphates are also highly effective sequestering agents for use in my invention. The preferred sequestering agent for most purposes is potassium metaphosphate. Suitable potassium metaphosphate polymers contain from 15 to 80 $KPO_3$ units per molecule. The ratio of $K_2O$ to $P_2O_5$ apparently does not influence the effectiveness of the phosphate polymer as a sequestering agent for my purposes. I have employed a metaphosphate having a $K_2O$ to $P_2O_5$ ratio of 1:1 with excellent results. A particularly suitable metaphosphate made by the conversion of monopotassium phosphate, is available commercially from the Victor Chemical Works and is commonly known as potassium metaphosphate. Although any sequestering agent can be used in the preparation of carrageenin water gels of improved elasticity, it is important to choose one which is effective in the pH range in which the gel is to be produced since certain sequestering agents are effective under varied conditions, whereas others are effective only in a basic solution. Potassium metaphosphate, for example, has strong chelating power from slightly basic or neutral conditions down to pH 2.5 to 3 in the acid range. Potassium pyrophosphate and potassium tripolyphosphate, on the other hand, are most useful under neutral or basic conditions but are of little value in an acid medium. The properties of the various sequestering agents which are useful in the present invention are well known in the art and are easily determined by routine experimentation and, therefore, the selection of a suitable sequestering agent for a particular pH range presents no problem to one skilled in the art.

Several embodiments of my invention are described in the following examples which are for illustration only and are not to be construed as limiting the scope of the invention as to the uses for which the improved gels are suitable, as to the proportions of the essential ingredients, or as to variations of the method of my invention which will readily occur to those skilled in the art.

EXAMPLE I

*Bland flavored carrageenin water gel desserts*

Bland flavored dessert gels, e. g. coffee and maple, are prepared by dissolving suitable quantities of carrageenin or Irish moss extractive, sequestering agent, sugar, flavoring, coloring and if necessary, a gel promoting salt, in water at a pH of about 5.5 to 8.5 at a temperature sufficiently high to effect solution and allowing the resulting sol to cool at room temperatures or, if desired, under refrigeration to form the gel. For most practical compositions the minimum solution temperature is above about 140° F. although this temperature varies somewhat, as those skilled in the art will understand, since it is affected by the concentration of salts in the sol.

The gels of this example were prepared using the quantities (taken in grams) of carrageenin or Irish moss extractive, sequestering agent and gelation promoting salts listed in the table below and a flavored sugar composition consisting of 70 grams of sucrose and 3.5 grams of commercially available instant coffee per pint of water.

TABLE I

| Extractive | Sequestering Agent | Gelation Promoting Salt | | | |
|---|---|---|---|---|---|
| | Potassium Metaphosphate | Potassium Chloride | Potassium Sulfate | Potassium Acetate |
| SeaKem 14 | 2.5 | 3.0 | | | |
| SeaKem 14 | 2.5 | 2.5 | | | |
| SeaKem 6 | 2.5 | 1.9 | 0.5 | | |
| SeaKem 6 | 2.5 | 0.7 | 0.9 | | |
| SeaKem 6 | 3.0 | 1.0 | | | |
| SeaKem 6 | 2.3 | 1.5 | 1.5 | | |
| SeaKem 6 | 2.3 | 1.5 | | 1.8 | |
| SeaKem 6 | 2.3 | 1.5 | | | 2.0 |
| Product A | 3.5 | 2.5 | | | |
| Product B | 3.0 | 1.2 | 1.2 | | |

| | | Potassium Pyrophosphate | | | |
| SeaKem 1 | 2.5 | 2.0 | | | |

| | | Potassium Tripolyphosphate | | | |
| SeaKem 14 | 2.0 | 3.3 | | | |

| | | Potassium Citrate | | | |
| SeaKem 6 | 3.2 | 2.4 | | | |

NOTE.—SeaKem is a trademark applied to Irish moss extractives available from the Seaplant Chemical Corporation; Product A is a commercially available roll dried extractive of Irish moss containing shortening cations in naturally occurring proportions; Product B is a commercially available alcohol precipitated Irish moss extractive consisting principally of sodium carrageenate.

As can be seen from Table I I have been able to employ as little as one part of potassium metaphosphate to four parts of Irish moss extractive when using tap water available in New Bedford, Mass., in the preparation of bland desserts having a pH of about 8.5 to 5.5. More sequestering agent would be required, however, in areas having higher dissolved salts.

EXAMPLE II

Tart flavored carrageenin water gel desserts

Tart flavored carrageenin dessert gels, e. g. citrus and berry flavors, contain acid and an acid buffer as well as the sugar, coloring, flavoring materials, carrageenin, sequestering agent and optional gelation promoting salt used in the bland flavored dessert gels of Example I. The desired tart taste can be provided by citric, fumaric, or adipic acids or any other edible acids. The buffer can be a salt of one of these acids. In order to avoid the necessity for adding large quantities of sequestering agent to counteract shortening ions added with the buffer, it is preferred to use potassium salts as buffers. The amounts of acid and buffer required vary with taste requirements and the alkalinity of the other ingredients of the dessert mix as will be understood by those skilled in the art. In general these amounts are adjusted to obtain a sol having a pH from about 2.5 to about 4.5 and most frequently from about 3.0 to about 4.0.

The gelling compositions listed in Table II below (all weights being in grams) are for use with sufficient acid ingredients to produce gels having a pH of about 3.0 to about 4.0 when added to a pint of water with about 70 grams of flavored sugar.

TABLE II

| Extractive | Sequestering Agent | Gelation Promoting Salts | | | |
|---|---|---|---|---|---|
| | Potassium Metaphosphate | Potassium Chloride | Potassium Sulfate | Potassium Acetate | |
| SeaKem 14 | 3.0 | 4.0 | | | |
| SeaKem 14 | 3.2 | 3.2 | | | |
| SeaKem 6 | 3.5 | 2.6 | 0.7 | | |
| SeaKem 14 | 2.5 | 2.5 | 1.5 | | |
| SeaKem 14 | 2.5 | 2.5 | | 1.8 | |
| SeaKem 14 | 2.5 | 2.5 | | | 2.0 |
| Product A | 4.0 | 3.0 | 1.0 | | |
| Product B | 3.5 | 1.5 | 1.5 | | |
| | | Potassium Citrate | | | |
| SeaKem 6 | 3.2 | 2.4 | | | |

NOTE.—The extractives employed here are identified in the note below Table I.

The minimum effective proportion of potassium metaphosphate for use with tap water from New Bedford, Mass., in the preparation of tart desserts having a pH of 2.5 to 4.5, as seen from Table II, is about three parts of metaphosphate to four parts of Irish moss extract.

The bland and tart carrageenin water gel dessert compositions described in Examples I and II all produce gels having a breaking strength comparable to that of commercially available dessert gels which find wide public acceptance. The gel strength can, of course, be increased or decreased to suit the taste by adjusting the concentration of carrageenin, of gelation promoting salts or sequestering agent if the latter is used in place of such salts as is well known to those familiar with the art. Dessert gels produced as described above in the pH range from about 8.5 to 2.5 exhibit markedly improved elasticity, a smooth cut and a pleasing mouth feel, which are characteristic of the gels produced according to my invention as opposed to the carrageenin gels of the prior art.

EXAMPLE III

Carrageenin water gel table jellies

Edible table jellies were prepared by the method of the present invention employing the following ingredients:

| Ingredient: | Weight in grams |
|---|---|
| Sucrose | 200 |
| Corn syrup solids | 20 |
| Citric acid, anhydrous | 0.2 |
| SeaKem 14 | 1.25 |
| Potassium metaphosphate | 1.25 |
| Flavor and color to taste. | |
| Water | 120 |

NOTE.—SeaKem 14 is identified in the note below Table I.

Dry mint and cinnamon flavoring agents available from the Van-Amerigen Haebler Corp. were used in an amount of 0.85 gram to flavor batches of the above formulation. Other flavoring agents and the usual food coloring materials can also be used. When fruit juices are employed as the flavoring agent they are substituted for part or all of the water in the formulation.

The jellies were prepared by mixing all of the dry ingredients except the sugar, adding the liquid ingredients and then heating the mixture to a boil with mild agitation. The sugar was then added to the boiling mixture which was stirred until boiling resumed. The mixture was then poured into jelly glasses and allowed to cool. The resulting jellies were entirely satisfactory in clarity, elasticity, and spreading qualities. Two other batches of jelly were prepared by the above procedure except that 100 grams of sugar instead of 200 grams was used one batch and the acid ingredient was eliminated in the other to provide less sweet and less tart jellies respectively. Satisfactory jellies were obtained in both instances. Satisfactory jellies such as these could not be prepared by substituting pectin for the carrageenin since the sugar and acid content of these batches would be too low to gel pectin.

EXAMPLE IV

Carrageenin water gel dental impression gel

A dental impression gel was prepared from the following ingredients:

| Ingredient: | Weight in grams |
|---|---|
| SeaKem 14 | 15 |
| Potassium Metaphosphate | 10 |
| Glycerin | 100 |
| Water | 400 |

NOTE.—SeaKem 14 is identified in the note below Table I.

The dry ingredients were mixed with the glycerin, the water added to the resulting slurry, and the whole mixture brought to a boil. The hot mixture was then poured into a dental mold and allowed to set. When the carrageenin gel had formed, the mold was opened and the shaped article removed. The article was relatively tough and elastic and had a high breaking strength, which made it satisfactory for the purpose of this example. Various types of inert fillers can be added to dental impression gels prepared by the above method in order to achieve a more aesthetic color, or to aid in releasing the formed article from the plaster casts which are frequently used. The proportions of carrageenin and sequestering agent can be varied over a range to obtain desired gel strengths and gelling temperatures. Carrageenin gels prepared in the usual manner without the addition of a sequestering agent are not satisfactory as dental impression gels.

I claim:

1. A composition, useful for the preparation of carrageenin water gels having improved texture and elasticity, consisting essentially of carrageenin and the potassium salt of a sequestering agent, said sequestering agent being present in said composition in an amount sufficient to sequester substantially all of the shortening ions present when the composition is dissolved in an aqueous medium.

2. The composition of claim 1 in which the sequestering agent is the water soluble potassium salt of an organic hydroxy carboxylic acid.

3. The composition of claim 1 in which the sequestering agent is potassium pyrophosphate.

4. The composition of claim 1 in which the sequestering agent is potassium tripolyphosphate.

5. The composition of claim 1 in which the sequestering agent is a potassium metaphosphate.

6. A composition, useful for the preparation of carrageenin water gels having improved texture and elasticity, comprising carrageenin, the potassium salt of a sequestering agent and a soluble gelation promoting salt, said sequestering agent being present in said composition in an amount sufficient to sequester substantially all of the shortening ions present in excess of about 0.05 gram equivalent of shortening ion per liter of carrageenin sol produced when the composition is dissolved in an aqueous medium.

7. A composition, soluble in water to produce a water gel dessert having a pH from about 8.5 to about 2.5, which comprises carrageenin, the potassium salt of a sequestering agent, sugar and flavoring; said sequestering agent being present in said composition in an amount sufficient to sequester substantially all of the shortening ions present in excess of about 0.05 gram equivalent of shortening ion per liter of carrageenin sol produced when the composition is dissolved in an aqueous medium.

8. A composition, soluble in water to produce a bland flavored water gel dessert having a pH from about 8.5 to about 5.5, which comprises carrageenin, the potassium salt of a sequestering agent, sugar and a bland flavoring; said sequestering agent being present in said composition in an amount sufficient to sequester substantially all of the shortening ions present in excess of about 0.05 gram equivalent of shortening ion per liter of carrageenin sol produced when the composition is dissolved in an aqueous medium.

9. A composition, soluble in water to produce a tart flavored water gel dessert having a pH from about 4.5 to about 2.5, which comprises carrageenin, the potassium salt of a sequestering agent, sugar and a tart flavoring; said sequestering agent being present in said composition in an amount sufficient to sequester substantially all of the shortening ions present in excess of about 0.05 gram equivalent of shortening ion per liter of carrageenin sol produced when the composition is dissolved in an aqueous medium.

10. The composition of claim 7 in which the sequestering agent is potassium metaphosphate.

11. The composition of claim 8 in which the sequestering agent is potassium metaphosphate.

12. The composition of claim 9 in which the sequestering agent is potassium metaphosphate.

13. A composition, soluble in water to produce a sol and then a gel, which comprises carrageenin and potassium metaphosphate the latter being present in sufficient amount to enhance the elastic properties of the gel by reducing the effective concentration of any shortening ions present in said sol to less than about 0.05 gram equivalent per liter.

14. The method of producing carrageenin water gels having improved texture and elasticity which comprises preparing a gellable aqueous sol of carrageenin, sequestering the shortening ions present in said sol with the potassium salt of a sequestering agent and allowing the sol to gel.

15. The method of producing a carrageenin water gel dessert having improved texture, elasticity and eating qualities, which comprises preparing a gellable aqueous sol of carrageenin having a pH from about 8.5 to about 2.5, sequestering the shortening ions present in said sol with the potassium salt of a sequestering agent to reduce the shortening ion content of said sol to less than about 0.05 gram equivalent per liter and allowing the sol to gel.

16. The method of claim 15 in which the sequestering agent is potassium metaphosphate.

17. An elastic carrageenin water gel produced by the method of claim 14.

18. An elastic carrageenin water gel produced by the method of claim 15.

19. An elastic carrageenin water gel produced by the method of claim 16.

References Cited in the file of this patent

UNITED STATES PATENTS

| | | |
|---|---|---|
| 2,466,146 | Baker | Apr. 5, 1949 |
| 2,620,335 | Nielsen et al | Dec. 2, 1952 |
| 2,669,519 | Baker | Feb. 16, 1954 |